United States Patent [19]

St. Marie et al.

[11] Patent Number: 5,326,187

[45] Date of Patent: Jul. 5, 1994

[54] COVER FOR A RAIL OF A FENCE

[76] Inventors: Rodney L. St. Marie, 7747 184 Street, Surrey, B.C., Canada, V3S 4P1; Frederik H. deJong, 2903 Silverlake Place, Coquitlam, B.C., Canada, V3C 6A2; Anthony I. Funk, 5863 188A Street, Surrey, B.C., Canada, V3S 7T3

[21] Appl. No.: 961,297

[22] Filed: Oct. 15, 1992

[51] Int. Cl.[5] .......................... E04C 2/00; E04G 7/00
[52] U.S. Cl. ................................... 403/402; 403/205; 52/823; 52/728
[58] Field of Search ................ 403/205, 402; 52/823, 52/727, 728, 738, 300

[56] References Cited

U.S. PATENT DOCUMENTS

| | | | |
|---|---|---|---|
| 370,437 | 9/1887 | Wright | 52/300 |
| 1,363,413 | 12/1920 | Hester | 52/728 |
| 2,140,234 | 12/1938 | Lamer | 52/718.05 |
| 2,564,386 | 2/1946 | Webb | 52/823 |
| 2,636,189 | 4/1950 | Feldman | 52/823 |
| 2,821,754 | 2/1958 | Hillson | 52/288 |
| 3,271,919 | 9/1966 | Olton | 52/823 |
| 3,347,006 | 10/1967 | Fox | 52/300 |
| 3,416,282 | 12/1968 | Daugherty | 52/823 |
| 3,478,478 | 7/1968 | Luebs | 52/211 |
| 4,390,164 | 6/1983 | Cokelekoglu | 403/263 |
| 4,682,451 | 7/1987 | Hubble | 52/728 |
| 4,858,413 | 8/1989 | Grushka | 52/823 |
| 4,890,426 | 1/1990 | Hickman | 52/300 |

FOREIGN PATENT DOCUMENTS 2442935  8/1980  France .................. 52/728

Primary Examiner—P. Austin Bradley
Assistant Examiner—Rex E. Pelto

[57] ABSTRACT

A cover to cover the upper rail of a railing. The upper rail has a top, bottom and side. The cover has a curved top with a concave inner surface to be positioned adjacent the top of the rail. The longitudinal ribs on the inner surface. The side walls to be positioned adjacent the sides of the upper rail. There are flanges on the bottom of the side walls to contact the bottom of the rail to locate the cover on the rail.

4 Claims, 2 Drawing Sheets

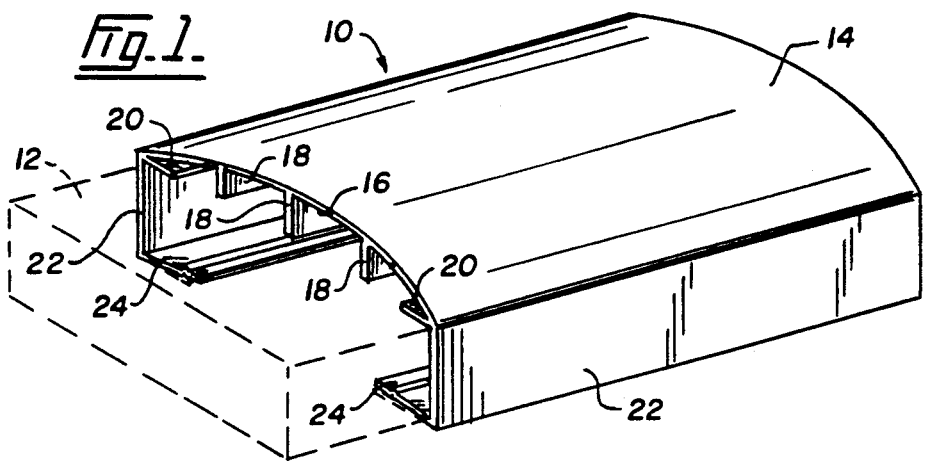
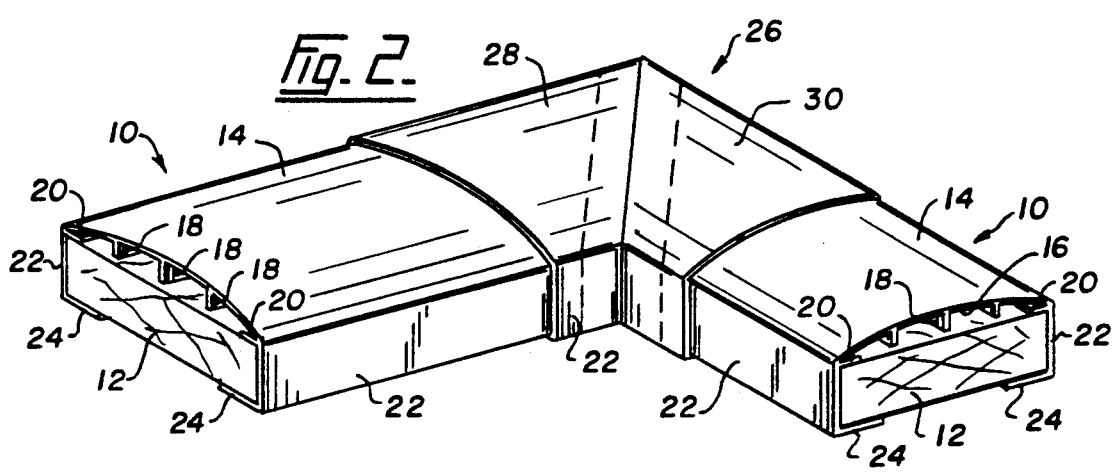
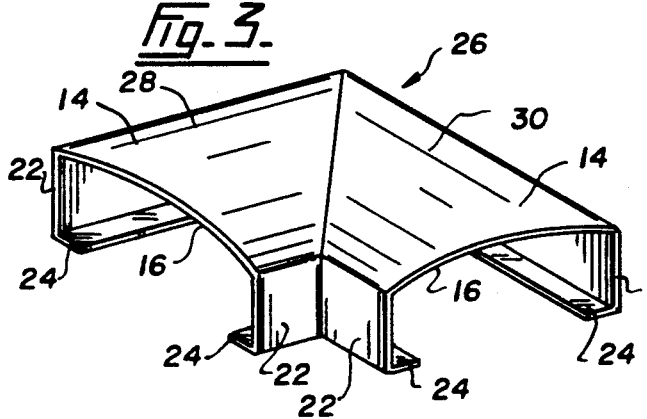
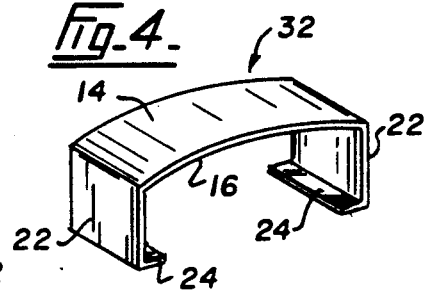

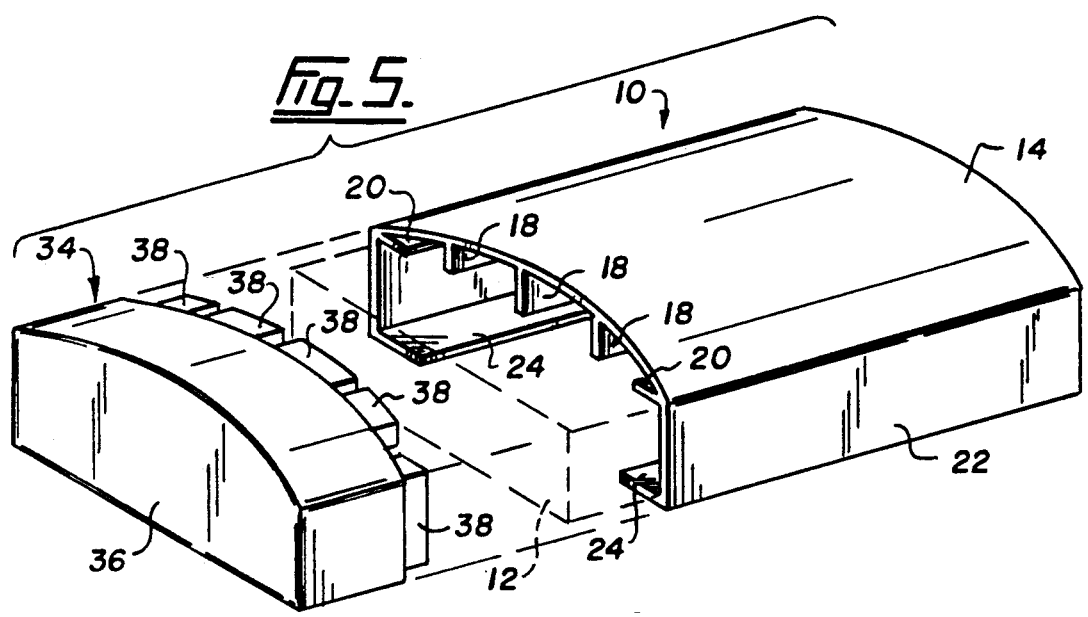
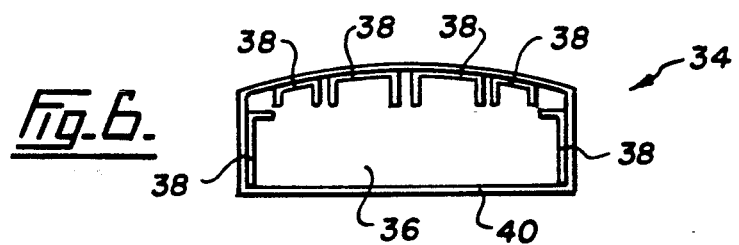

COVER FOR A RAIL OF A FENCE

FIELD OF THE INVENTION

This invention relates to a cover adapted to cover the upper rail of a railing, a handrail, or a fence,

DESCRIPTION OF THE PRIOR ART

Railings, particularly on balconies and the like, are frequently made of wood. Wood is widely available and is easily worked. However, at least for upper rails wood is not an ideal material. Even though painted or stained it weathers. Furthermore, it marks fairly easily and no finishes that can be applied really render wood completely wear resistant. In the circumstances people leaning on the rail or brushing against the rail, tend to mark it.

In these circumstances, there have been a number of suggestions to protect upper rails. Typically the idea is to use a cover of a material having better wear resistance, for example a plastic or a metal. Nevertheless, these proposals have not received wide acceptance. There is an increasing tendency to make fences of metal but that is an expensive proposition compared with the use of wood. It is therefore preferable to make a wooden structure and protect just the upper rail.

The prior art known to applicants consists of U.S. Pat. Nos. 2,564,386 to Webb; 1,363,413 to Hester; 2,636,189 to Feldman; 3,478,478 to Luebs; 4,682,451 to Hubble; 3,416,282 to Daugherty; 3,271,919 to Olton; 2,821,754 to Hillson; 3,347,006 to Fox and 2,140,234 to Lamer.

Of the above patents Webb discloses a covered crib rail. The cover is made from thermoplastic material and has a curved top surface. The cover is formed with webs that firmly secure it to the top rail. Hester discloses a wood member that is covered with metal with tabs or flanges. Feldman discloses a plastic rail covering including a central rib. Luebs discloses a snap on plastic cover and Hubble through Lamer disclose other protective coverings that are of interest.

SUMMARY OF THE INVENTION

Despite the above prior art there appears still to be a need of an effective cover, useful to fit to an upper rail of a railing to protect the upper rail regardless of rough treatment or weather.

The present invention is addressed to this need.

Accordingly the present invention provides a cover adapted to cover the upper rail of a railing, the upper rail having a top and a bottom and sides, the cover comprising a curved top with a concave inner surface to be positioned adjacent the top of the rail; a plurality of longitudinal ribs on said inner surface; side walls to be positioned adjacent the sides of the upper rail; flanges on the ends of the side walls, remote from the curved top, to contact the bottom of the rail to locate the cover on the rail.

The cover is made of a resilient material able to be distorted to fit over the rail and then to resile to contact the rail. Polyvinyl chloride (PVC) has proved useful.

BRIEF DESCRIPTION OF THE DRAWINGS

The invention is illustrated in the drawings in which:
FIG. 1 is an isometric view of a cover according to the present invention;
FIG. 2 is an isometric view showing the cover of FIG. 1 in combination with a corner cap;
FIG. 3 is an isometric view of a corner cap useful in the invention;
FIG. 4 illustrates an expansion joint useful with the invention;
FIG. 5 illustrates an end cap useful with the present invention; and
FIG. 6 is an end view of the end cap of FIG. 5.

DESCRIPTION OF THE PREFERRED EMBODIMENTS

FIGS. 1 and 2 show a cover 10 adapted to cover the upper rail 12 of a fence. In FIGS. 1 and 2 the rail 12 is shown as a two by six. Clearly any dimension is appropriate. Only the upper rail 12 of the railing is shown. The cover 10 has a curved top 14 with a concave inner surface 16 positioned adjacent the top of the rail 12. There is a plurality of longitudinal ribs on the inner surface 16. FIG. 1 shows a first set of ribs 18, extending downwardly, and edge ribs 20, extending inwardly and contacting the upper surface of the rail 12. In fact, in many circumstances the edge ribs 20 may not be necessary.

There are side walls 22 to be positioned adjacent the sides of the rail 12. There are flanges 24 on the ends of the side walls 22, that is remote from the curved top 14. These flanges 24 contact the bottom of the rail 12 to secure the cover 10 on the rail 12 as shown most clearly in FIGS. 1 and 2.

To use the embodiment of FIGS. 1 and 2 the cover 10 is distorted by gripping the flanges 24 and moving them outwardly, away from each other. In this way the cover 10 is positioned over the rail 12 then moved downwardly to allow the flanges 24 to resile back into position, the position shown in FIGS. 1 and 2, to secure the cover on the upper rail.

FIG. 2 shows the use of a corner cap 26 and FIG. 3 is the corner cap 26 alone. The illustrated corner cap 26 is to go round a right-angle in the fence and comprises first 28 and second 30 parts at 90° to each other. It will be appreciated that the angle can be made to suit any angle in the railing but a right-angle is probably the most common. The same reference numerals are used in FIG. 3 as in FIGS. 1 and 2 as the structure of the corner cap 26 is the same as for the structure of the cover 10 except that the longitudinal ribs 18 and 20 are not present. It is more difficult to distort the corner cap 26 to fit it in position and the ribs tend to make the structure more rigid and make distortion difficult. Furthermore, with the short lengths of the corner cap the ribs are not necessary and their omission is therefore a desirable economy.

The corner caps 26 may also be angled at their ends as shown in dotted lines in FIG. 2 that is they are abbreviated. This means that the beneficial effect of the ribs is extended. The covers 14 will extend further and they, of course, are formed with ribs 18 unlike the end caps 30.

The presence of ribs is generally desirable. They are omitted from the corner cap of FIG. 3, and from the expansion joint of FIG. 4 only because it is necessary to omit them. In general the ribs provide rigidity to the structure and also provide a space for the circulation of air to allow the rail 12 to dry, thus avoiding rot.

FIG. 4 shows an expansion joint 32 that can be used to join lengths of cover 10. The joint 32 laps over the ends of neighbouring covers 10 to allow for expansion of the covers with heat and to cover the ends.

The expansion joints 32 do not have ribs 18 and 20 first as an economy, secondly because the joints 32 fit over the covers 10 and the internal ribs would hinder the positioning of the expansion joint over the covers.

FIGS. 5 and 6 illustrate an end cap useful with the present invention. The end cap 34 has an end wall 36 that acts to close off the open end of the cover 14. The end cap 34 is provided with fingers 38 that extend to engage between the ribs 18 so that the end cap 36 is securely located to the cover 14. The results are a pleasing effect rather than the end grain of the wood or view of the interior of a cover 14. The end cap is designed to be fitted with a base 40, unlike the cover 14, because the end cap is essentially to protect the end of the wood and the end of the cover 14 and slides into position longitudinally.

The cover of the present invention, and the expansion joints, corner caps, and end caps are made of plastic, for example polyvinyl chloride. The plastic should be chosen generally to resist the coldest temperatures that will be met by the cover. Plastic may be painted but, preferably, is pigmented.

The cover can be made by simple extrusion.

The present invention thus provides a simple structure, that can be easily and economically made and yet provides great resistance to wear and weathering. It is useful for use outdoors as a cover for any rail, particularly the upper rail of a railing but also bannisters and the like. The cover greatly improves the durability of the rail but also improves its appearance.

We claim:

1. A unitary cover adapted to cover the upper rail of a railing, the upper rail having a top and a bottom and sides, the cover comprising:
   a curved top with a concave inner surface to be positioned adjacent the top of the rail;
   a plurality of longitudinal ribs on said inner surface;
   side walls to be positioned adjacent the sides of the upper rail;
   flanges on the ends of the side walls, remote from the curved top, to contact the bottom of the rail to locate the cover on the rail, the cover being of a plastic material and being means for distorting to fit over the rail and then being mean for resiling to contact the rail.

2. A cover as claimed in claim 1 in combination with a corner cap comprising integral first and second parts at an angle to each other other than 180°, the structure of the corner cap being as for the cover except that the longitudinal ribs are not present in the corner cap.

3. A cover as claimed in claim 1 in combination with an expansion joint dimensioned to be positioned between, and to overlap, two covers, the structure of the expansion joint being as for the cover except that the longitudinal ribs are not present.

4. A cover as claimed in claim 1 in combination with an end cap provided with fingers adapted to engage between the longitudinal ribs on the inner surface of a cover to close an open end of the cover.

* * * * *